United States Patent [19]
Bellamy et al.

[11] Patent Number: 5,268,592
[45] Date of Patent: Dec. 7, 1993

[54] SEQUENTIAL CONNECTOR

[75] Inventors: Paul D. Bellamy; Ted T. Takayesu, both of Poughkeepsie, N.Y.

[73] Assignee: International Business Machines Corporation, Armonk, N.Y.

[21] Appl. No.: 661,283

[22] Filed: Feb. 26, 1991

[51] Int. Cl.[5] .................................. H01R 9/09
[52] U.S. Cl. ............................. 307/43; 361/58
[58] Field of Search ................ 361/58; 323/908

[56] References Cited

U.S. PATENT DOCUMENTS

| | | | |
|---|---|---|---|
| 3,710,197 | 1/1973 | Olds et al. | 317/118 |
| 4,079,440 | 3/1978 | Ohnuma et al. | 361/424 |
| 4,200,865 | 4/1980 | Morioka et al. | 340/536 |
| 4,245,270 | 1/1981 | Busby | 361/58 |
| 4,454,552 | 6/1984 | Barnes et al. | 361/9 |
| 4,510,553 | 4/1985 | Faultersack | 361/413 |
| 4,574,332 | 3/1986 | Calabro | 361/413 |
| 4,747,783 | 5/1988 | Bellamy et al. | 439/59 |
| 5,028,809 | 7/1991 | Watanabe et al. | 307/137 |

FOREIGN PATENT DOCUMENTS 402055 12/1990 European Pat. Off. .

OTHER PUBLICATIONS

IBM Technical Disclosure Bulletin, vol. 34, No. 4A, Sep. 1991, pp. 9-10, 'Hot-Plug Circuit'.
Ellis, "Replacing a Power Supply Under Microprocessor Control in an Operating System", IBM Technical Disclosure Bulletin (IBM TDB), May 1985, pp. 7239-7241.
Badaoui et al., "Circuit Allowing Card Hot Plugging and Unplugging", IBM TDB, Nov. 1988, pp. 125-127.
Kisacky et al., "Charge Controller for Power-On Plugging and Unplugging of Electronic Components", IBM TDB, Aug. 1990, pp. 244-246.

*Primary Examiner*—A. D. Pellinen
*Assistant Examiner*—Aditya Krishnan
*Attorney, Agent, or Firm*—Floyd A. Gonzalez; William A. Kinnaman, Jr.

[57] ABSTRACT

A circuit for facilitating hot plugging by limiting the inrush current when a card is plugged into a board having plural card-receiving slots. A single MOSFET charging circuit for all of the cards is provided on the board for each voltage level supplied to the cards. Each card connector half has a staggered set of pins so that, upon insertion of a card, the following events occur in sequence (1) the card ground is connected to the board ground through a high-resistance path; (2) the card ground is connected to board ground through a low-resistance path and the MOSFET source is coupled to the card components; (3) the MOSFET gate is coupled through a card jumper to a bias supply; (4) the normal connection is made between the voltage supply and the card components; and (5) the connection to the card components from the MOSFET source is broken.

12 Claims, 2 Drawing Sheets

SEQUENTIAL CONNECTOR

BACKGROUND OF THE INVENTION

1. Field of the Invention

This invention relates to a connector for providing a "hot pluggable" connection between an electronic circuit board and one or more printed circuit cards carried by the board.

2. Description of the Related Art

A highly desirable feature in a system containing electronic circuit boards is a "concurrent maintenance" capability, whereby a part of the system may be serviced simultaneously with the normal operation of the remainder of the system. This has the obvious advantage that the entire system need not be deactivated simply to service or replace the defective part. To provide such a concurrent maintenance capability, systems have been devised for allowing for the "hot plugging" cards into boards while the system is powered up and in normal operation. Generally, such systems involve providing a current-limiting circuit on the card, through which the card load is initially charged before supplying the card load with power directly. This has been implemented, for example, using field-effect transistors (FETs) such as metal oxide semiconductor (MOS) FETs, in conjunction with sequential connectors in which certain pins are staggered so as to make or break an electrical connection before other pins of the connector. In such systems, the connection sequence is such as first to connect the card ground and board ground, then connect the voltage supply from the board to the current limiter on the card, and finally to connect the voltage supply to the card load directly.

While such systems are capable of providing hot pluggability and concurrent maintenance, several problems remain. First, there is the obvious expense of providing a separate current-limiting circuit on each card which may plug into a board. Second, such systems are susceptible to high-frequency noise resulting from parasitic oscillations occurring when the drain pin of the board is joined to the card. This connection typically produces a sudden inrush of current into the card to charge the MOSFET's parametric capacitance, typically about 3,000 pf. Still another problem associated with systems of the prior art is the electrostatic discharge (ESD) that often results when a card is mated with a board. In the past, this problem has required the use of conductive card holders, which provide a shunt path between the board ground and the card ground, bypassing sensitive electronic components.

SUMMARY OF THE INVENTION

In general, this invention contemplates a card-board connection system in which concurrent maintenance capability and hot pluggability are provided by having a single current-limiting circuit on the board for each voltage level to be supplied to one or more cards, rather than placing such a current-limiting circuit on each card as in the prior art. Preferably, each card connects to the board through a sequential connector which, in sequence, (1) connects the card ground to board ground through a high-resistance path, (2) connects the card ground to board ground directly and connects a current-limited voltage supply from the board to the card, (3) completes a circuit through a jumper to supply an activating pulse to the current-limiting circuit, (4) connects the voltage supply to the card load directly, and (5) disconnects the current limited supply to the card load and breaks the jumper connection. By placing the current-limiting circuit on the board rather than on each card that connects to the board, one can materially reduce the cost of such a system. In addition, placing the current-limiting circuit on the board rather than on each card eliminates the high frequency parasitic oscillations that are otherwise created when the drain pin of a card is connected to a board. Finally, connecting the card and board grounds first through a high-resistance path rather than directly eliminates the need for the conductive card holders that might otherwise be necessary.

DESCRIPTION OF THE PREFERRED EMBODIMENTS

Figure 1:
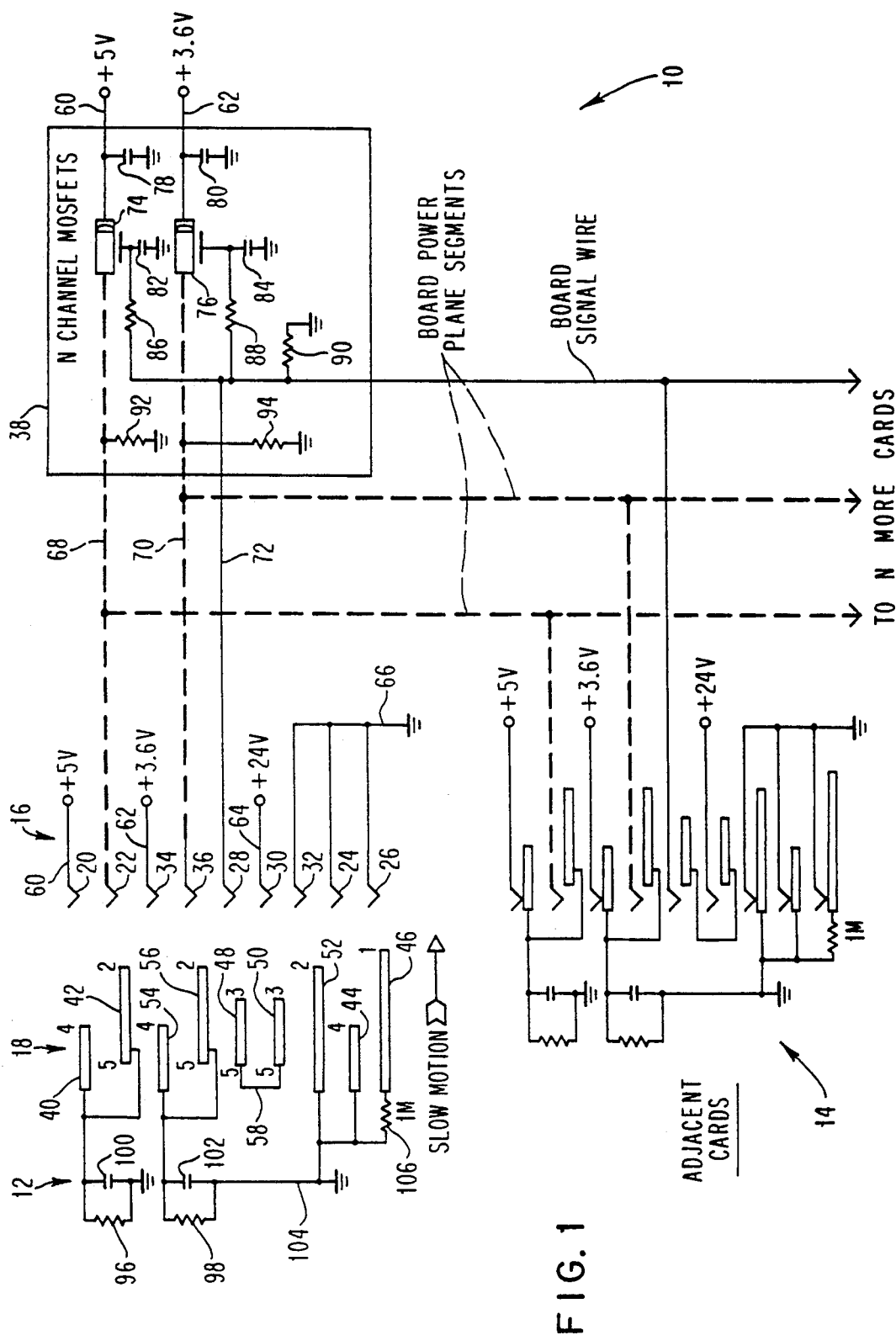
FIG. 1 is a schematic diagram of an embodiment of the present invention in which a card edge connector composed of flat lands of various lengths is used.

FIG. 1 shows one embodiment of the present invention in which a plurality of cards 12 and 14 may be plugged into a single board 10. Although the circuitry for only a pair of adjacent cards 12 and 14 is shown in FIG. 1, it will be apparent that a greater number of cards could be provided for if desired. Each connection between the board 10 and a card is similar to the connection between board 10 and card 12, which consists of a board connector half 16 and a mating card connector half 18. (The word "half" refers to a mating connector portion and does not imply any relative size.) Similar pairs of mating board and card connector halves 16 and 18 are used for the remaining cards 14, one of which is shown in FIG. 1. Board connector half 16 contains a plurality of contacts 20–36 which mate with respective card contacts 40–56. In a manner to be described more fully below, card contacts 40–56 are so arranged as to make a connection with the corresponding board contacts 20–36 in a predetermined sequence, with certain of the card contacts also breaking the connection with the corresponding board contacts at a predetermined stage of insertion. Referring now to the various pairs of contacts, board contact 20, which mates with card contact 40, is coupled directly to the +5 volt supply line 60 on the board 10. Board contact 22, which mates with card contact 42, is coupled to the same +5 volt supply line 60 through a current-limiting charging circuit 38. More particularly, board contact 22 is coupled to a line 68 originating from the source terminal of an N-channel MOSFET 74 of circuit 38, the drain (D) of the MOSFET being coupled directly to the +5 volt supply line 60. A filter capacitor 78 also provides a path between the +5 volt line 60 and board ground 66, while a resistor 92 provides a connection between line 68 and board ground.

In a similar manner, board contact 34, which mates with card contact 54, is coupled directly to a +3.6 volt supply line 62, while a board contact 36 mating with a card contact 56 is coupled to the same line 62 via a MOSFET 76 in circuit 38. MOSFET 76 has its drain coupled to the +3.6 volt line 62 and its source coupled to a line 70 coupled to board contact 36. A filter capacitor 80 provides a path between the drain of MOSFET 76 and ground, while a resistor 94 couples the source of the same MOSFET to ground. Respective capacitors 82 and 84 couple the gates of MOSFETs 74 and 76 to board ground. Respective resistors 86 and 88 couple the MOSFET gates to a line 72. Line 72 is coupled to board ground 66 through a resistor 90 and is coupled to a board contact 28 mating with card contact 48. A jumper 58 on the card 12 couples card contact 48 to an adjacent card contact 50, which mates with board contact 30. Board contact 30 is in turn coupled to a +24 volt supply line 64.

Board contacts 24, 26 and 32, which mate with respective card contacts 44, 46 and 52, are coupled directly to board ground 66. Card contacts 44 and 52 are likewise coupled to card ground 104, while card contact 46 is coupled to card ground 104 through a 1 megohm resistor 106. Card contacts 40 and 42 are coupled to the ungrounded terminal of a first card load 96, while card contacts 54 and 56 are coupled to the ungrounded terminal of a second card load 98. Card loads 96 and 98 consist simply of the various electronic components on the card 12, which have not been separately shown. Although card loads 96 and 98 are shown as resistors, it will be apparent that each of these loads could also contain a substantial capacitive component. Respective filter capacitors 100 and 102 provide paths between the ungrounded sides of loads 96 and 98 and card ground 104.

As noted above, card contacts 40-56 consists of lands whose leading and trailing edges are staggered relative to one another as shown in FIG. 1. The relative positioning of the various leading and trailing contact edges relative to the card edge (not shown in FIG. 1) is indicated by the numbers appearing adjacent to the contact edges. Thus, card contact 46 has a 1 next to its leading edge, indicating that contact 46 mates with board contact 26 at point 1 in the insertion sequence and remains in contact as the card 12 is fully inserted. On the other hand, the numbers 2 and 5 adjacent to the leading and trailing edges of card contact 2 indicate that the card contact makes a connection with the corresponding board contact 22 at point 2 in the insertion sequence and breaks the same contact at point 5 in the same sequence.

The overall sequence of operation for insertion of card 12 into board 10 will now be described. Initially, signal line 72 is at a relatively low potential and MOSFETS 74 and 76 are nonconductive. Upon insertion of card 12 into board 10, the first event to happen, at point 1 in the insertion sequence, is the making of the connection between board contact 26 and card contact 46, establishing a high-resistance path between board ground 66 and card ground 104 via resistor 106. This allows for the transfer of charge to or from the board 10 as is necessary to equalize the potentials of the two grounds 66 and 104, eliminating the large inrush current caused by electrostatic charge on the card.

At point 2 in the insertion sequence, connections are established simultaneously between contact pairs 22 and 42, 32 and 52, and 36 and 56. This establishes a low-resistance path between card ground 104 and board ground 66 (via contacts 32 and 52) and establishes a connection between the respective output lines 68 and 70 from current limiter 38 and card loads 96 and 98 (via contact pairs 22 and 2 and 36 and 56). At this time, MOSFETS 74 and 76 remain unactuated.

Thereafter, at point 3 in the insertion sequence, jumper 58 establishes a path between the +24 volt supply line 64 and signal line 72, via contact pairs 28 and 48 and 30 and 50. As a result, the gates of MOSFETS 74 and 76 receive a high potential via respective resistors 86 and 88, rendering the MOSFETS conductive. The time constant of resistor 86 and capacitor 82, as well as that of resistor 88 and capacitor 84, is such that the MOSFETS 74 and 76 are actuated gradually, as the capacitors become charged. Upon being actuated in this manner, current limiter 38 supplies potentials that rise in a controlled manner on output lines 68 and 70. Since these lines 68 and 70 were previously connected to respectively card loads 96 and 98 via contact pairs 22, 42 and 36, 56 at point 2 in the insertion sequence, the capacitors 100 and 102 of the card loads charge in a controlled manner in accordance with the slowly rising potentials on lines 68 and 70.

At point 4 in the insertion sequence, lines 68 and 70 will have substantially reached the potential of respective supply lines 60 and 62. At this point in the sequence, card contacts 40 and 54 make respective connections with board contacts 20 and 34, as a result of which supply lines 60 and 62 are coupled directly to card loads 96 and 98. In addition, card contact 44 engages board contact 24 to establish an even lower resistance path between the card ground 104 and the board ground 66 than the path provided by contacts 52 and 32. Although shown as only a single pair of mating contacts in FIG. 1, each of contacts 44 and 24 is preferably realized as a plurality of separate contact elements distributed along the length of the card or board edge.

Finally, at point 5 in the insertion sequence, card contacts 42 and 56 break their existing connection with board contacts 22 and 36 to uncouple current limiter lines 68 and 70 from the card loads 96 and 98. Simultaneously, card contacts 48 and 50 disengage from board contacts 28 and 30 to break the jumper connection between the +24 volt line 64 and the signal line 72 coupled to the gates of MOSFETS 74 and 76. Removing the potential from the MOSFET gates in this manner deactuates the current limiter 38, returning it to its state before card 12 was inserted. At this point, the insertion sequence for card 12 is complete and another card such as card 14 may be inserted into board 10, at which time the sequence of events described above is repeated. Upon the removal of a card 12 or 14 from the board 10, the same sequence of events occurs as during the insertion sequence, but in the reverse order.

Figure 2:
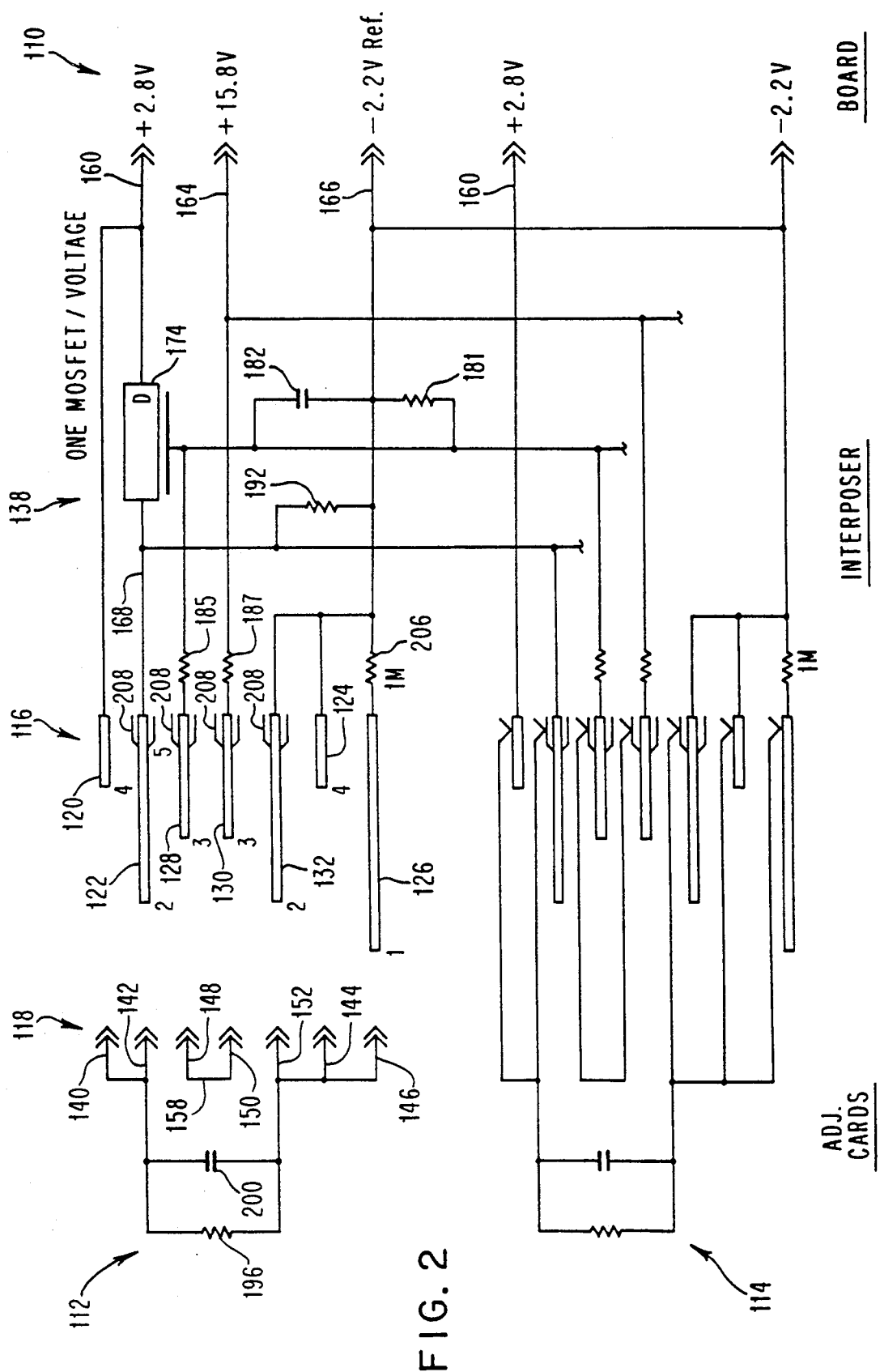
FIG. 2 is a schematic diagram of an embodiment of the present invention in which round pins on the board having covered insulating portions are used.

FIG. 2 shows a connection system that is similar to that of FIG. 1, but with a different means for providing the sequential connections. Corresponding elements of the two figures have been similarly numbered. Thus, element 10 of FIG. 1 corresponds to element 110 of FIG. 2, and so on. In the system shown in FIG. 2, the sequential connections are provided by board contacts in the form of pins 120-132 which have staggered leading edges as shown in the figure. Pins 122, 128, 130 and 132 are provided with insulated portions 208 upon which the corresponding card contacts 142, 148, 150 and 152 rest when the card is fully inserted to make the required connection break at point 5 in the connection sequence.

The connection system shown in FIG. 2 also differs in several other respects from the system shown in FIG. 1. Each card 112 and 114 has only a single load 196; as a consequence, only one MOSFET 174 on the board 110 is required. In addition, the interground resistor 206 is placed on the board side of the board-card interface rather than on the card side as was resistor 106. From the standpoint of electrical performance, these two layouts are equivalent. Also, gate capacitor 182 has a resistor 181 in parallel between the gate and board ground ("−2.2V Ref." in FIG. 2) 166. Finally, rather than having a single series charging resistor 86 or 88 for each MOSFET as in FIG. I, in FIG. 2 each card 112 or 114 has a pair of charging resistors 185 and 187 associated with it, with one resistor 185 on the board side of contact 128 and the other resistor on the board side of contact 130.

Various modifications will be apparent to those skilled in the art. Thus, while two arrangements for providing sequential connections have been shown, others could be used alternatively if desired. In addition, while the preferred use of the connection scheme described herein is to permit the hot plugging of a plurality of cards into a single board, no particular type or number of substrates or supporting surfaces is necessarily implied. Further, while N-channel MOSFETs are used in the charging circuits of the preferred embodiments, other devices, such as P-channel MOSFETs or PNP bipolar transistors, could also be used.

What is claimed is:

1. Apparatus for coupling a load to a power supply comprising:
    a charging circuit coupled to said power supply;
    a first connector half having a first contact coupled to said charging circuit and a second contact coupled directly to said power supply;
    a second connector half having a first and second contacts coupled to said load, corresponding contacts of said first and second connector halves forming pairs;
    said first and second connector halves capable of being mated to each other;
    said first and second contact pairs being of lengths such that upon an initial mating of said connector halves, said load is initially connected to said charging circuit only through said first contact pair;
    said lengths of said first and second contact pairs are such that upon a final mating of said connector halves, said first pair of contacts disconnects said load from said charging circuit, and said second contact pair directly connects said load to said power supply.

2. An apparatus as in claim 1 wherein said first and second connector halves each have third contacts;
    said charging circuit having a control input coupled to said third contact of said first connector half;
    said third contact pair suppling a control signal to said control input upon said initial mating of said connector halves.

3. Apparatus as in claim 1 in which said charging circuit comprises a transistor.

4. Apparatus as in claim 1 in which said charging circuit comprises a field-effect transistor.

5. Apparatus as in claim 1 in which said transistor has a gate coupled to a control line upon said initial mating of said connector halves.

6. Apparatus as in claim 4 in which said transistor has a drain coupled to said power supply and a source coupled to said first contact of said first connector half.

7. Apparatus as in claim 2 including an RC circuit, said control signal being supplied to said control input through said RC circuit.

8. An apparatus as in claim 2 wherein said third contact pair is of a length such that said control signal is disconnected from said control input upon said final mating of said connector halves.

9. An apparatus as in claim 2 wherein said first and second connector halves each have fourth contacts;
    said third and fourth contacts of said second connector half being connected to each other;
    said fourth contact of said first connector half being connected to a control line;
    said third and fourth contact pairs connecting said control input to said control line upon said initial mating of said connector halves.

10. An apparatus on a circuit board comprising:
    a current-limiting circuit coupled to a power supply;
    a connector having first and second contacts;
    said first contact being coupled to said current-limiting circuit, said second contact being coupled directly to said power supply;
    said first and second contacts each having first and second ends, said first ends of said contacts being substantially coplanar at said connector;
    said first contact being of a greater length than said second contact; and
    said first contact being covered with insulating material at a portion of said first contact nearest said connector.

11. An apparatus as in claim 10 wherein said connector has a third contact;
    said charging circuit having a control input coupled to said third contact.

12. An apparatus as in claim 11 wherein said third contact has an end substantially coplanar to said first end of said first and second contacts;
    said third contact being covered with insulating material at a portion of said third contact nearest said connector.

* * * * *